United States Patent
Jungwirth

(10) Patent No.: US 10,690,876 B2
(45) Date of Patent: Jun. 23, 2020

(54) ENHANCED IMAGE DETECTION FOR CELESTIAL-AIDED NAVIGATION AND STAR TRACKER SYSTEMS

(71) Applicant: Honeywell International Inc., Morris Plains, NJ (US)

(72) Inventor: Matthew Edward Lewis Jungwirth, Golden Valley, MN (US)

(73) Assignee: Honeywell International Inc., Morris Plains, NJ (US)

( * ) Notice: Subject to any disclaimer, the term of this patent is extended or adjusted under 35 U.S.C. 154(b) by 157 days.

(21) Appl. No.: 15/713,487

(22) Filed: Sep. 22, 2017

(65) Prior Publication Data

US 2019/0094026 A1 Mar. 28, 2019

(51) Int. Cl.
| | |
|---|---|
| *G01C 21/02* | (2006.01) |
| *G02B 27/22* | (2018.01) |
| *G02B 7/00* | (2006.01) |
| *G02B 13/16* | (2006.01) |
| *H04N 5/225* | (2006.01) |
| *G02B 27/64* | (2006.01) |

(52) U.S. Cl.
CPC ............. *G02B 7/005* (2013.01); *G01C 21/02* (2013.01); *G01C 21/025* (2013.01); *G02B 13/16* (2013.01); *H04N 5/2254* (2013.01); *G02B 27/64* (2013.01)

(58) Field of Classification Search
CPC ........ G02B 7/005; G02B 27/64; G02B 13/16; G01C 21/025; G01C 21/02; H04N 5/2254
USPC ..................................................... 250/203.1
See application file for complete search history.

(56) References Cited

U.S. PATENT DOCUMENTS

| | | | |
|---|---|---|---|
| 3,048,352 A | 1/1954 | Hansen | |
| 3,015,457 A | 1/1962 | Dixson | |
| 4,678,263 A | 7/1987 | Funato | |
| 5,012,081 A | 4/1991 | Jungwirth et al. | |
| 5,231,443 A * | 7/1993 | Subbarao ................. | G02B 7/28 396/93 |
| 5,396,326 A | 3/1995 | Knobbe et al. | |
| 5,809,457 A | 9/1998 | Yee et al. | |
| 6,272,432 B1 | 8/2001 | Li et al. | |
| 6,285,927 B1 | 9/2001 | Li et al. | |

(Continued)

FOREIGN PATENT DOCUMENTS

| | | |
|---|---|---|
| EP | 3073223 | 9/2016 |
| WO | 2014115155 | 7/2014 |

OTHER PUBLICATIONS

Lacoursiere et al., "Large-Deviation Achromatic Risley Prisms Pointing Systems", "Optical Scanning 2002", Jun. 6, 2002, pp. 123-131, Publisher: Proc. SPIE vol. 4773.

(Continued)

*Primary Examiner* — Seung C Sohn
(74) *Attorney, Agent, or Firm* — Fogg & Powers LLC

(57) ABSTRACT

An optical image tracker is disclosed. The optical image tracker includes a multi-dimensional translation stage. An optical image detector is disposed on a surface of the multi-dimensional translation stage. An objective lens is coupled to the optical image detector and configured to focus a collimated beam of light on the optical image detector, wherein the collimated beam of light includes a specific field of view within a field of regard, and the multi-dimensional translation stage is configured to position the optical image detector to detect the collimated beam of light.

14 Claims, 5 Drawing Sheets

(56) References Cited

U.S. PATENT DOCUMENTS

| | | | |
|---|---|---|---|
| 6,343,767 B1 | 2/2002 | Sparrold et al. | |
| 6,552,990 B1 | 4/2003 | Kajiyama et al. | |
| 6,639,698 B2 | 10/2003 | Choi et al. | |
| 7,282,695 B2 * | 10/2007 | Weber | G01S 7/4802 |
| | | | 250/203.1 |
| 7,312,429 B2 * | 12/2007 | Guyer | G01S 3/781 |
| | | | 250/203.1 |
| 7,898,712 B2 | 3/2011 | Adams et al. | |
| 3,009,543 A1 | 8/2011 | Bae et al. | |
| 8,049,886 B1 | 11/2011 | Raksi | |
| 8,400,511 B2 * | 3/2013 | Wood | G01C 3/08 |
| | | | 348/140 |
| 8,400,700 B2 | 3/2013 | Adams et al. | |
| 8,597,025 B2 | 12/2013 | Belenkii et al. | |
| 8,772,690 B2 | 7/2014 | Smith et al. | |
| 9,341,517 B1 | 5/2016 | Stone | |
| 9,377,533 B2 | 6/2016 | Smits | |
| 9,644,920 B2 | 5/2017 | Jahromi et al. | |
| 9,746,323 B2 * | 8/2017 | Wood | G01C 3/08 |
| 2005/0195505 A1 | 9/2005 | Braun et al. | |
| 2006/0028550 A1 | 2/2006 | Palmer, Jr. et al. | |
| 2008/0046138 A1 | 2/2008 | Fowell et al. | |
| 2009/0177398 A1 | 7/2009 | Belenkii et al. | |
| 2010/0157771 A1 | 6/2010 | Ross et al. | |
| 2011/0285981 A1 | 11/2011 | Justice et al. | |
| 2013/0044317 A1 | 2/2013 | Justice et al. | |
| 2016/0282123 A1 | 9/2016 | McCroskey et al. | |
| 2018/0341003 A1 | 11/2018 | Jungwirth et al. | |

OTHER PUBLICATIONS

Craig Schwarze, "A New Look At Risley Prisms", "Photonics Spectra", Jun. 2006, pp. 1-5, Publisher: Optra, Inc.

Jungwirth et al., "Risley Prism Based Star Tracker and Celestial Navigation Systems", "U.S. Appl. No. 15/604,501, filed May 24, 2017", May 24, 2017, pp. 1-17.

Willhite, "An Analysis of ICBM Navigation Using Optical Observations of Existing Space Objects", Jun. 2004, pp. 1-123, Publisher: Department of Aeronautics and Astronautics, Published in: US.

European Patent Office, "Extended European Search Report from EP Application No. 16159288.6 dated Aug. 22, 2016", "from Foreign Counterpart of U.S. Appl. No. 14/865,709", filed Aug. 22, 2016, pp. 18, Published in: EP.

Jungwirth, "Apparatus and Method for a Holographic Optical Field Flattener", "U.S. Appl. No. 15/630,430", filed Jun. 22, 2017, pp. 1-29, Published in: US.

U.S. Patent and Trademark Office, "Advisory Action", U.S. Appl. No. 15/630,430, dated Apr. 24, 2019, pp. 15, Published: US.

U.S. Patent and Trademark Office, "Final Office Action", U.S. Appl No. 15/630,430, dated Feb. 21, 2019, pp. 1-13, Published: US.

U.S. Patent and Trademark Office, "Interview Summary", U.S. Appl. No. 15/630,430, dated Jan. 23, 2019, pp. 1-6, Published: US.

U.S. Patent and Trademark Office, "Notice of Allowance", U.S. Appl. No. 15/604,501, dated Apr. 10, 2019, pp. 1-13, Published: US.

U.S. Patent and Trademark Office, "Office Action", U.S. Appl. No. 15/630,430, dated Nov. 27, 2018, pp. 1-14, Published: US.

U.S. Patent and Trademark Office, "Restriction Requirement", U.S. Appl. No. 15/604,501, dated Dec. 18, 2018, pp. 1-6, Published: US.

U.S. Patent and Trademark Office, "Restriction Requirement", U.S. Appl. No. 15/630,430, dated Oct. 3, 2018, pp. 1-9, Published: US.

U.S. Patent and Trademark Office, "Notice of Allowance", U.S. Appl. No. 15/630,430, dated Oct. 7, 2019, pp. 1-11, Published: US.

U.S. Patent and Trademark Office, "Office Action", U.S. Appl. No. 15/630,430, dated Jul. 11, 2019, pp. 1-15, Published: US.

U.S. Patent and Trademark Office, "Corrected Notice of Allowability", U.S. Appl. No. 15/630,430, dated Dec. 3, 2019, pp. 1-7, Published: US.

* cited by examiner

US 10,690,876 B2

ENHANCED IMAGE DETECTION FOR CELESTIAL-AIDED NAVIGATION AND STAR TRACKER SYSTEMS

STATEMENT REGARDING FEDERALLY SPONSORED RESEARCH OR DEVELOPMENT

This invention was made with Government support under a Restricted Contract awarded by the Department of the Air Force—AFRL/RWK. The Government has certain rights in the invention.

BACKGROUND

A celestial-aided navigation system can be utilized to correct for navigation errors, such as drift, in inertial sensors in an inertial navigation system within a vehicle such as, for example, a spacecraft or satellite. One example of a celestial-aided navigation system is a star tracker system. A star tracker system includes an optical device that can be utilized, for example, to determine a vehicle's location, velocity and/or attitude based upon the position of at least one celestial body (e.g., star, planet, the Moon, the Sun), and also determine a two-dimensional reference frame that indicates the position of the celestial body (e.g., in polar or Cartesian coordinates).

It is desirable for a star tracker system to have a field of regard (FOR) as wide as possible and a field of view (FOV) as narrow as possible, in order to be able to detect as much of the sky as possible, and ensure that identifiable celestial bodies can be differentiated between and thus detected by the system involved. For example, it is desirable for a star tracker system to have a cone-shaped FOR with a diameter as wide as 120 degrees, and the ability to measure differential angles between celestial bodies with an uncertainty of less than 1 µrad (1E-6 radians) within a 120 degree maximum FOV (MFOV). However, conventional celestial-aided navigation and star tracker systems nearly capable of measuring such small differential angles, within such large MFOVs, have to utilize very large detector arrays that can differentiate between celestial bodies and detect an image of a celestial body of interest. Notably, such large detector arrays are very costly in terms of their inefficient utilization of limited space, their large power losses, and their high financial costs for procurement and maintenance. Consequently, a need exists for a celestial-aided navigation or star tracker system with a less costly optical image detector array, which can differentiate between celestial bodies within a large MFOV, detect an optical image of a celestial body of interest, and also strive to minimize the size, weight and power (e.g., SWaP) required for the system involved.

SUMMARY

A system is provided. The system includes an optical image tracker including a multi-dimensional translation device and an optical image detector disposed on a surface of the multi-dimensional translation device. The system also includes an objective lens coupled to the optical image detector and configured to focus a collimated beam of light on the optical image detector. The collimated beam of light includes a specific field of view within a large field of regard, and the multi-dimensional translation device is configured to position the optical image detector to detect the collimated beam of light.

DRAWINGS

Understanding that the drawings depict only exemplary embodiments and are not therefore to be considered limiting in scope, the exemplary embodiments will be described with additional specificity and detail through the use of the accompanying drawings, in which.

In accordance with common practice, the various described features are not drawn to scale but are drawn to emphasize specific features relevant to the exemplary embodiments. Reference characters denote like elements throughout the figures and text.

DETAILED DESCRIPTION

Figure 1:
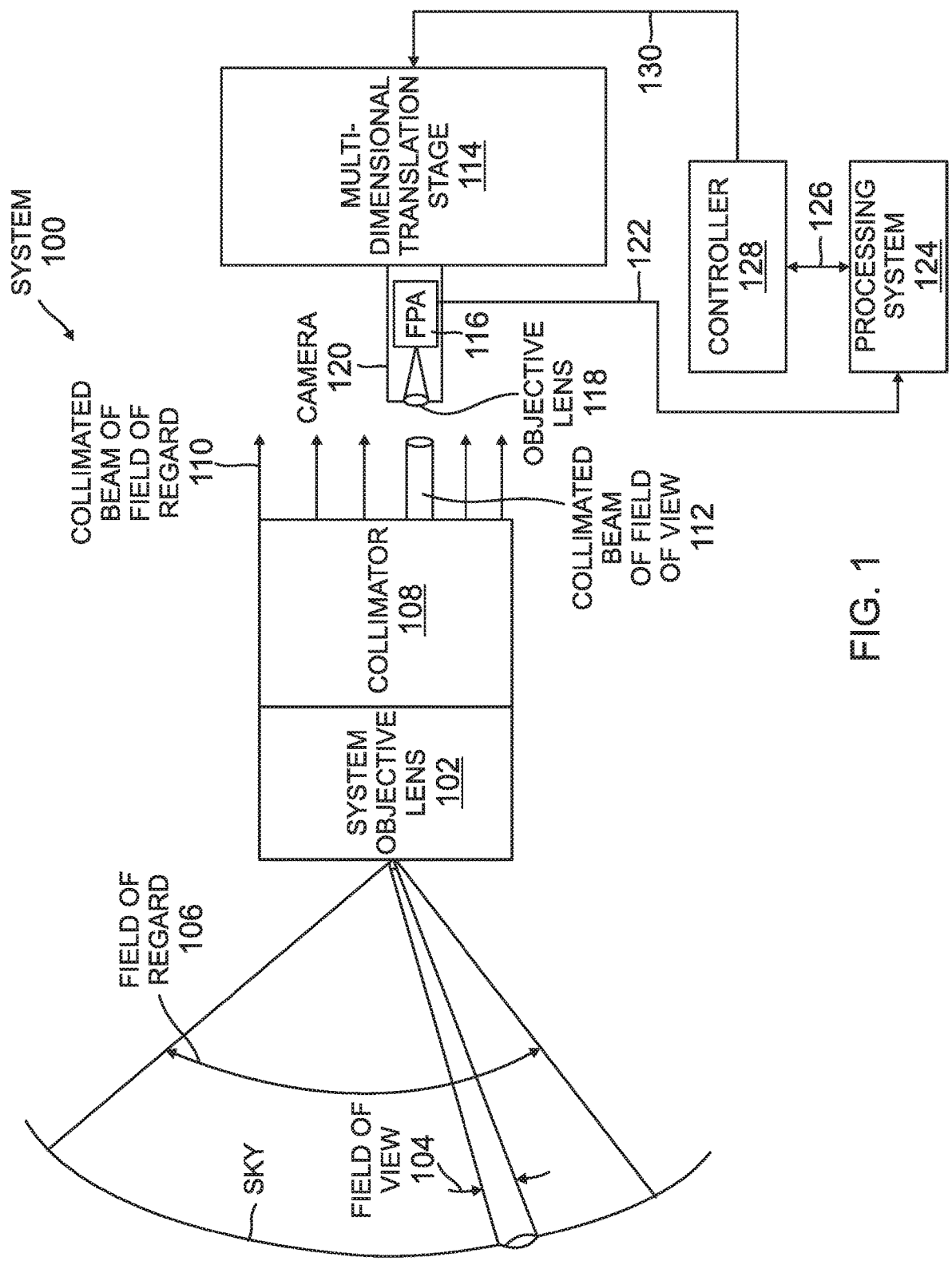
FIG. 1 illustrates a block diagram of a system that can be utilized to implement one example embodiment of the present invention.

In the following detailed description, reference is made to the accompanying drawings that form a part hereof, and in which is shown by way of illustration specific illustrative embodiments. However, it is to be understood that other embodiments may be utilized and that structural, mechanical, and electrical changes may be made. Furthermore, the method presented in the drawing figures and the specification is not to be construed as limiting the order in which the individual steps may be performed. The following detailed description is, therefore, not to be taken in a limiting sense.

FIG. 1 illustrates a block diagram of a system 100, which can be utilized to implement one example embodiment of the present invention. Referring to FIG. 1, the system 100 includes a system objective lens 102. For example, the system objective lens 102 can be a system of one or more convex, spherical lenses that can collect and concentrate the light from a small, cone-shaped FOV 104 within a large FOR 106 (e.g., up to ~120 degrees wide) as well as the entire FOR. The system objective lens 102 concentrates (or focuses) the light received from the FOV 104 and the FOR 106 to a focal point within the collimator 108. For example, the light received from the cone-shaped FOV 104 can include an optical image of a celestial body of interest.

For the embodiment illustrated in FIG. 1, the collimator 108 can be, for example, a system of one or more lenses that function to receive the focused light from the system objective lens 102, and transmit parallel or collimated beams of light received from both the FOR 106 and the FOV 104. For this illustrative example, a collimated beam of light for the FOR 106 is indicated as 110, and the collimated beam of light for the FOV 104 is indicated as 112. Note that the system objective lens 102 and the collimator 108 are depicted as separate components in the optical system illustrated in FIG. 1. However, in a second example embodiment, the system objective lens 102 and the collimator 108 can be formed as part of the same optical system, and thus there is no need for that optical system to have an intermediate image plane (as depicted in FIG. 1). Notably, for one exemplary embodiment, in order to attain the ability to measure differential angles between celestial bodies with an uncertainty of less than 1 µrad (1E-6 radians), the diameter of the entrance pupil of the system objective lens 102 can be approximately 1.22 meters, and the diameter of the collimated beam of light energy exiting the collimator 108 can be approximately 244 mm.

Notably, the system 100 also includes a multi-dimensional translation stage 114. For the exemplary embodiment shown, an array of optical image detectors (e.g., focal plane array or FPA) 116 is fixedly attached to the left-most surface of the multi-dimensional translation stage 114 depicted in a side view. Also, an objective lens 118 is fixedly attached to the same surface of the multi-dimensional translation stage 114. For the example depicted in FIG. 1, the objective lens 118 can be, for example, an objective lens of a camera 120, which is also attached to the surface of the multi-dimensional translation stage 114. In a different embodiment, the objective lens 118 could be, for example, a convex lens attached directly to the multi-dimensional translation stage 114 so that the focal point of the lens 118 would converge at the surface of the FPA 116. In one example embodiment, the camera 120 can be implemented with an F/1.4, 16 mm focal length camera, the FPA 116 can be implemented in a ⅔" format, and a single detected image can be 5.7 degrees FFOV of the 120 degree FOR.

As described below with respect to FIGS. 2A-2D, the multi-dimensional translation stage 114 positions the FPA 116 in the focal plane of the objective lens 118 for a specific FOV angle of interest, and thus the FPA 116 detects the imaged, collimated beam of light (112) for that specific FOV angle of interest. It is important to note that the stability of the optical image being tracked is enhanced significantly by the concurrent positioning of the objective lens 118 and the FPA 116 to receive the collimated beam of light for the FOV angle of interest. In any event, the accuracy of the positioning of the multi-dimensional translation stage 114 should be less than 0.1 of the pixel pitch for the detector array utilized in the FPA 116, which ensures that small, positional inaccuracies incurred utilizing the multi-dimensional translation stage 114 would have an insignificant effect on the overall ability of the system 100 to detect and track an optical image of interest. Notably, in accordance with the example embodiment depicted in FIG. 1, the dynamic range of the translation capability of the multi-dimensional translation stage 114 along the X and Y axes is 250 mm, and the resolution of the step size or translational increments of the multi-dimensional translation stage 114 is 1 micron. Therefore, each step or translational increment of the multi-dimensional translation stage 114 depicted in FIG. 1 shifts the FFOV of the camera 120 by 2 arc seconds.

Returning to the exemplary embodiment depicted in FIG. 1, an output of the FPA 116 is coupled by a suitable data communication line 122 to a processing system 124. For example, the processing system 124 can be a suitable data processing system, such as a personal computer, a microcomputer, or a microcontroller and the like. A voltage signal representing the optimal image detected by the FPA 116 is converted to a digital signal by the processing system 124. As such, the processing system 124 can be utilized, for example, to receive, process and/or analyze the optical image data from the FPA 116. The processing system 124 can also be utilized to calculate a positioning error in response to processing an optical image indicating the extent to which the multi-dimensional translation stage 114 should be re-positioned to correct the positioning error so that the collimated beam of the FOV 112 will be aligned with the focal plane of the objective lens 118 and the FPA 116.

The processing system 124 is coupled to a controller 128 via a suitable two-way data communication line 126. For example, the controller 128 can be a microcontroller, microcomputer or other suitable data processing device. The controller 128 is coupled to the multi-dimensional translation stage 114 via a suitable two-way communication line 130. As such, if positioning (or re-positioning) of the multi-dimensional translation stage 114 is required, the processing system 124 conveys a positioning error signal to the controller 128 via the communication line 126. In response to receiving the positioning error signal, the controller 128 translates the positioning error signal to a suitable signal that can control translation or movement actuators on the multi-dimensional translation stage 114, and conveys that signal via the communication line 130 to the multi-dimensional translation stage 114. Notably, as illustrated in, and described below with respect to FIGS. 2A-2C, the multi-dimensional translation stage 114 is at least capable of positioning the objective lens 118 and FPA 116 along one or more of five axes (e.g., horizontal, vertical, pitch, yaw and optical) in response to the signal received from the controller 128 via the communication line 130.

Notably, for this exemplary embodiment, the processing system 124 can convey positioning command data to the controller 128 via the data communication line 126 so that an operator or user can position or re-position the multi-dimensional translation stage 114 (along with the objective lens 118 and FPA 116) as desired. For example, the positioning command data could cause the multi-dimensional translation device 114 to be re-positioned so that the FPA 116 would detect the collimated beam of light for a different FOV angle.

Also note that if system 100 is implemented for celestial-aided inertial navigation system, the processing system 130 can include, for example, an inertial measurement unit (IMU) in communication with the processing system 130. However, if the system 100 is implemented for a star tracker system, such an IMU is not required.

Figure 2A:
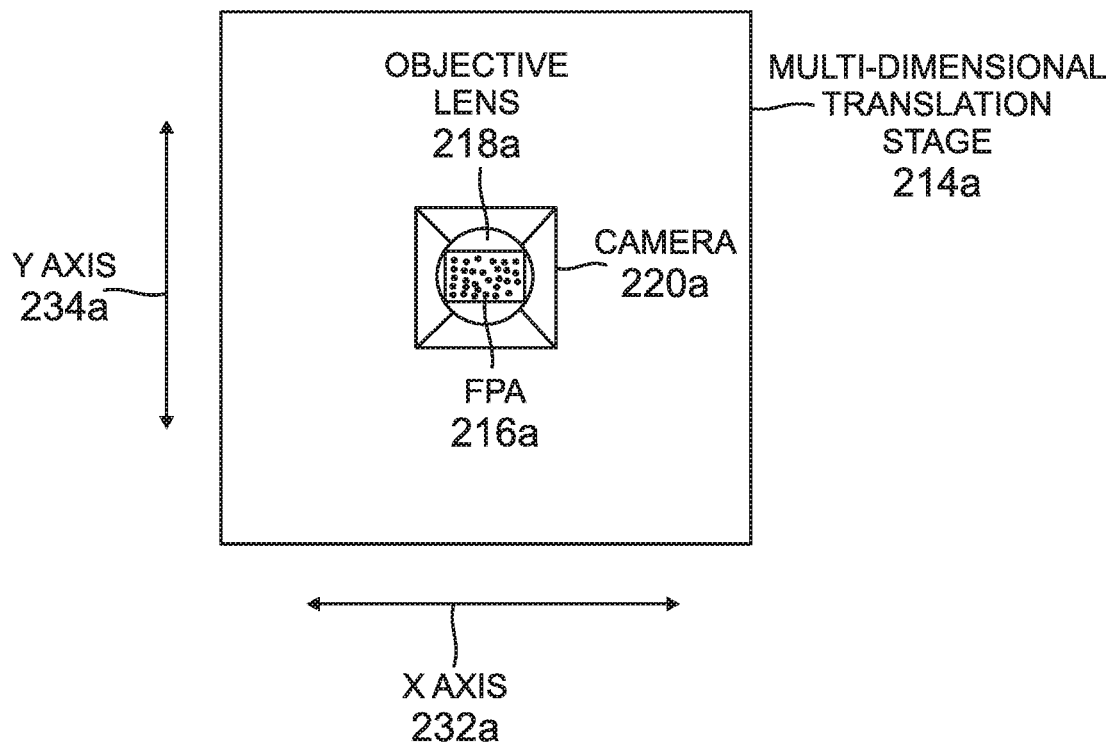
FIGS. 2A-2D are related diagrams illustrating four aspects of the example embodiment depicted in FIG. 1.
Figure 2B:
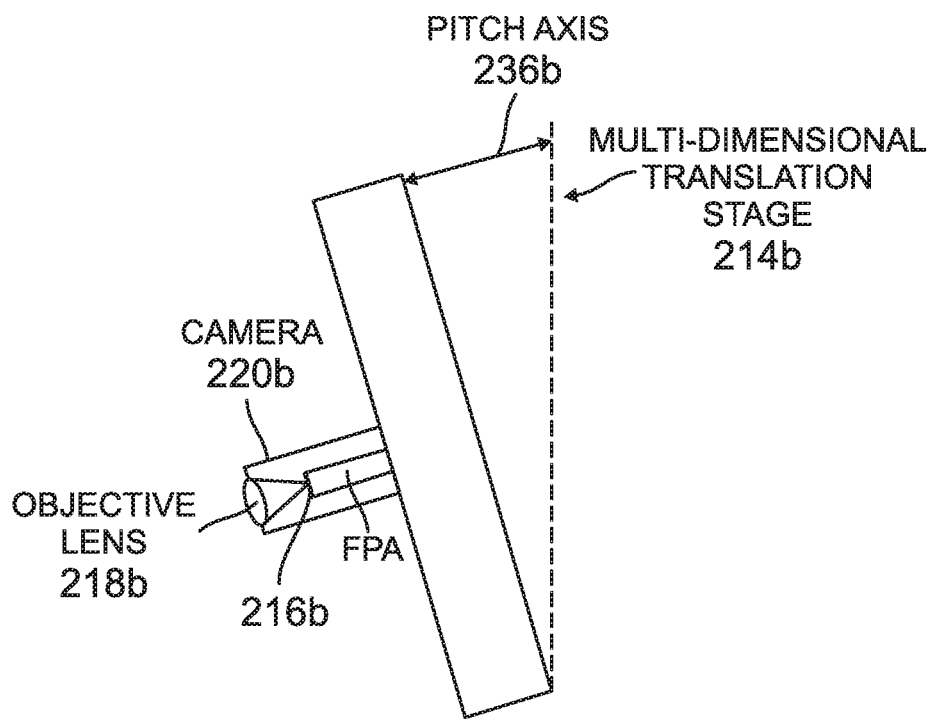
Figure 2C:
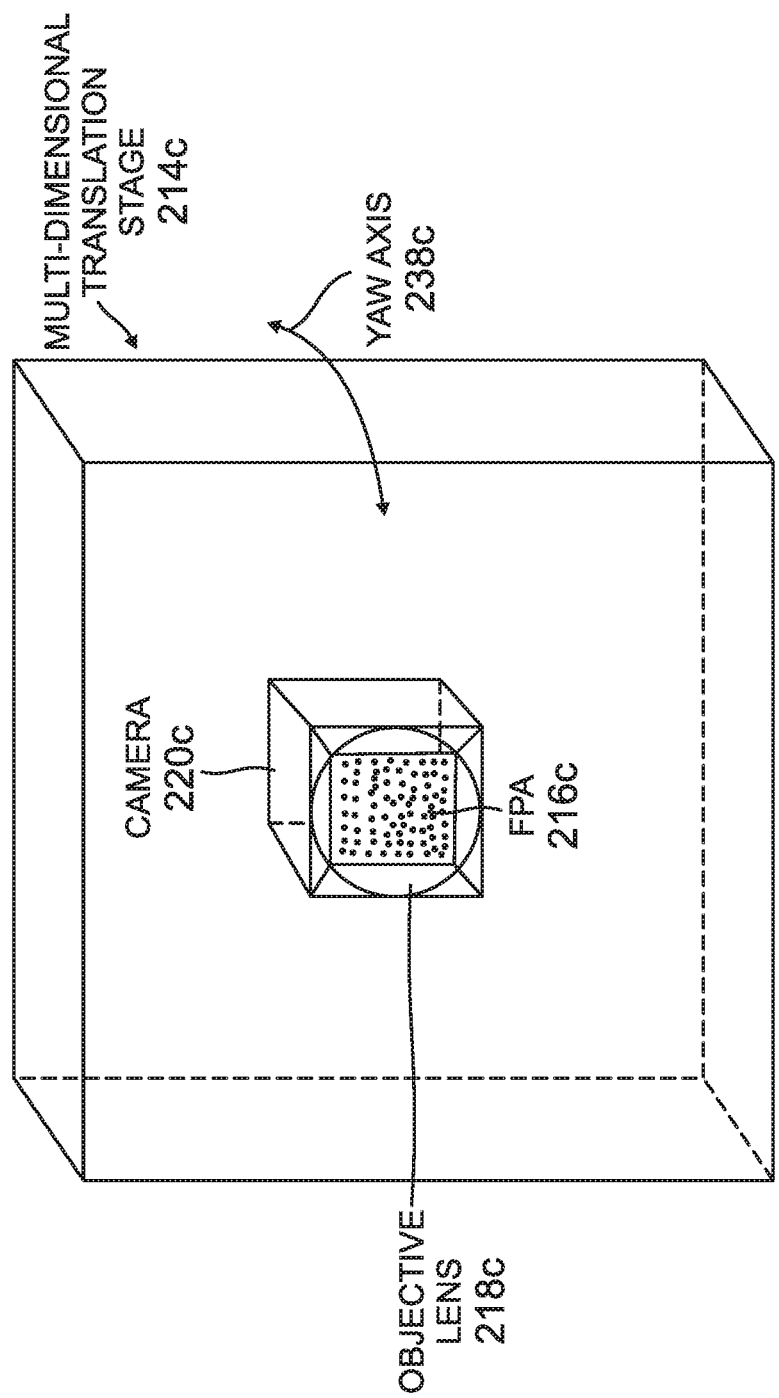

FIGS. 2A-2D are related diagrams illustrating four aspects of the example embodiment depicted in FIG. 1. It is important to note that the four angular degrees of freedom depicted in FIGS. 2A-2C provide a significant ability to correct for any curvatures in the aberration field of the lenses involved, and also provide an enhanced degree of control in selecting an FOV angle of interest.

Referring to FIG. 2A, a front view of a multi-dimensional translation stage 214a is shown (e.g., multi-dimensional translation stage 114 in FIG. 1). A camera 220a (e.g., camera 120 in FIG. 1) is attached to the surface of the multi-dimensional translation stage 214a. The camera 220a includes an objective lens 218a (e.g., objective lens 118 in FIG. 1) and an FPA 216a (e.g., FPA 116 in FIG. 1), which is also attached to the surface of the multi-dimensional translation stage 214a. As illustrated in this aspect of the exemplary embodiment depicted in FIG. 1, the multi-dimensional translation stage 214a can re-position the camera 220a at least in the horizontal (X) 232a and vertical (Y) 234a axes as shown.

Referring to FIG. 2B, a side view of a multi-dimensional translation stage 214b is shown (e.g., multi-dimensional translation stage 114 in FIG. 1). A camera 220b (e.g., camera 120 in FIG. 1) is attached to the left-most surface of the multi-dimensional translation stage 214b. The camera 220b includes an objective lens 218b (e.g., objective lens 118 in FIG. 1) and FPA 216b (e.g., FPA 116 in FIG. 1), which are also attached to the left-most surface of the multi-dimensional translation stage 214b. As illustrated in this aspect of the exemplary embodiment depicted in FIG. 1, the multi-dimensional translation stage 214b can re-position the camera 220b at least in the pitch axis 236b as shown.

Referring to FIG. 2C, a plane view of a multi-dimensional translation stage 214c is shown (e.g., multi-dimensional translation stage 114 in FIG. 1). A camera 220c (e.g., camera 120 in FIG. 1) is attached to the front surface of the multi-dimensional translation stage 214b. The camera 220c includes an objective lens 218c (e.g., objective lens 118 in FIG. 1) and FPA 216c (e.g., FPA 116 in FIG. 1), which are also attached to the front surface of the multi-dimensional translation stage 214c. As illustrated in this third aspect of the exemplary embodiment depicted in FIG. 1, the multi-dimensional translation stage 214c can re-position the camera 220c at least in the yaw axis 238c as shown. Note, for clarity, that the pitch axis 236b in FIG. 2B and the yaw axis 238c in FIG. 2C are orthogonal angular displacements.

Figure 2D:
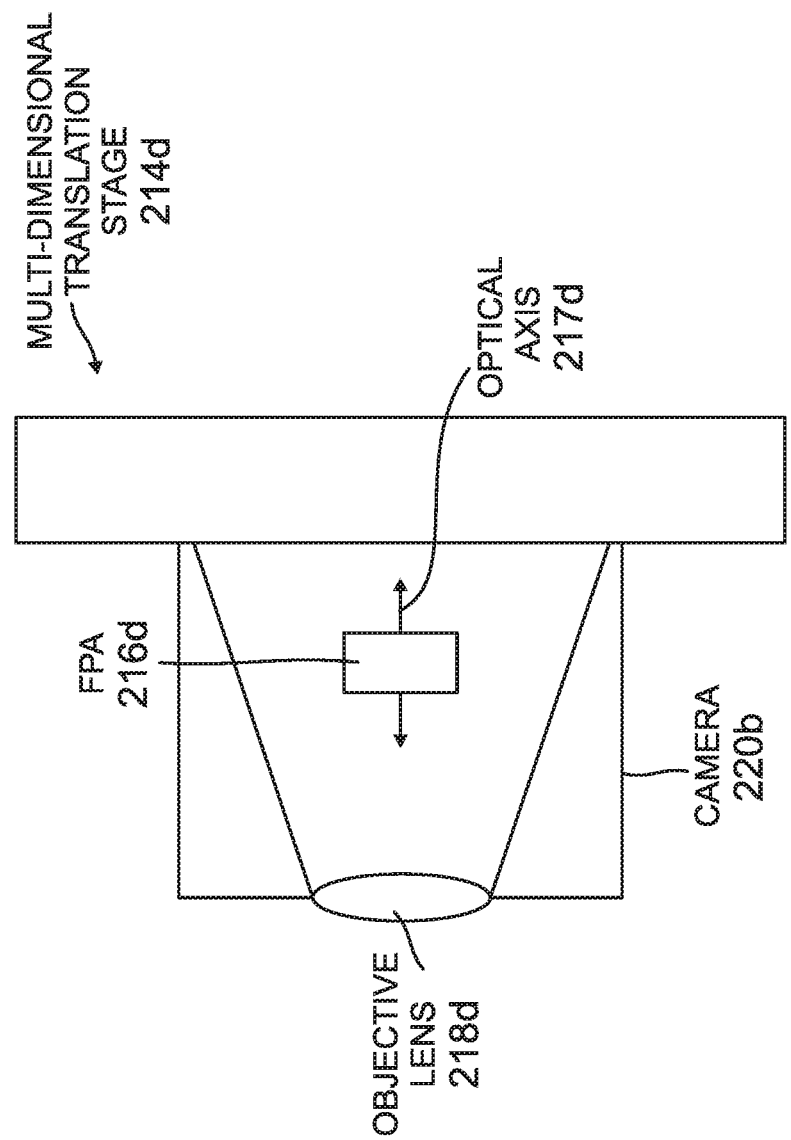

Referring to FIG. 2D, a side view of a multi-dimensional translation stage 214d is shown (e.g., multi-dimensional translation stage 114 in FIG. 1). A camera 220d (e.g., camera 120 in FIG. 1) is attached to the left-most surface of the multi-dimensional translation stage 214d. The camera 220d includes an objective lens 218d (e.g., objective lens 118 in FIG. 1) and a FPA 216d (e.g., FPA 116 in FIG. 1). The objective lens 218d is also attached to the left-most surface of the multi-dimensional translation stage 214d. As illustrated in this aspect of the exemplary embodiment depicted in FIG. 1, the FPA 216d can also be re-positioned along the optical axis of the focusing lens (e.g., objective lens 218d) within the camera 220d, as indicated by the arrows 217d. Notably, this optical axis translation capability is particularly beneficial in at least two ways: (1) A focus adjustment capability is thus provided to account for any misalignment that might occur between the focusing lens in the camera 220d and the FPA 216d, and an auto-focus capability is also thus provided that can be utilized to re-focus the optical image if the incident light received for a FOV angle of interest is not entirely collimated; and (2) Translating the position of the optical image utilizing the focus adjustment provides the ability to significantly enhance the resolution of the optical image (e.g., super resolution image) received utilizing, for example, a suitable image post-processing technique (e.g., phase diversity post-processing technique).

Figure 3:
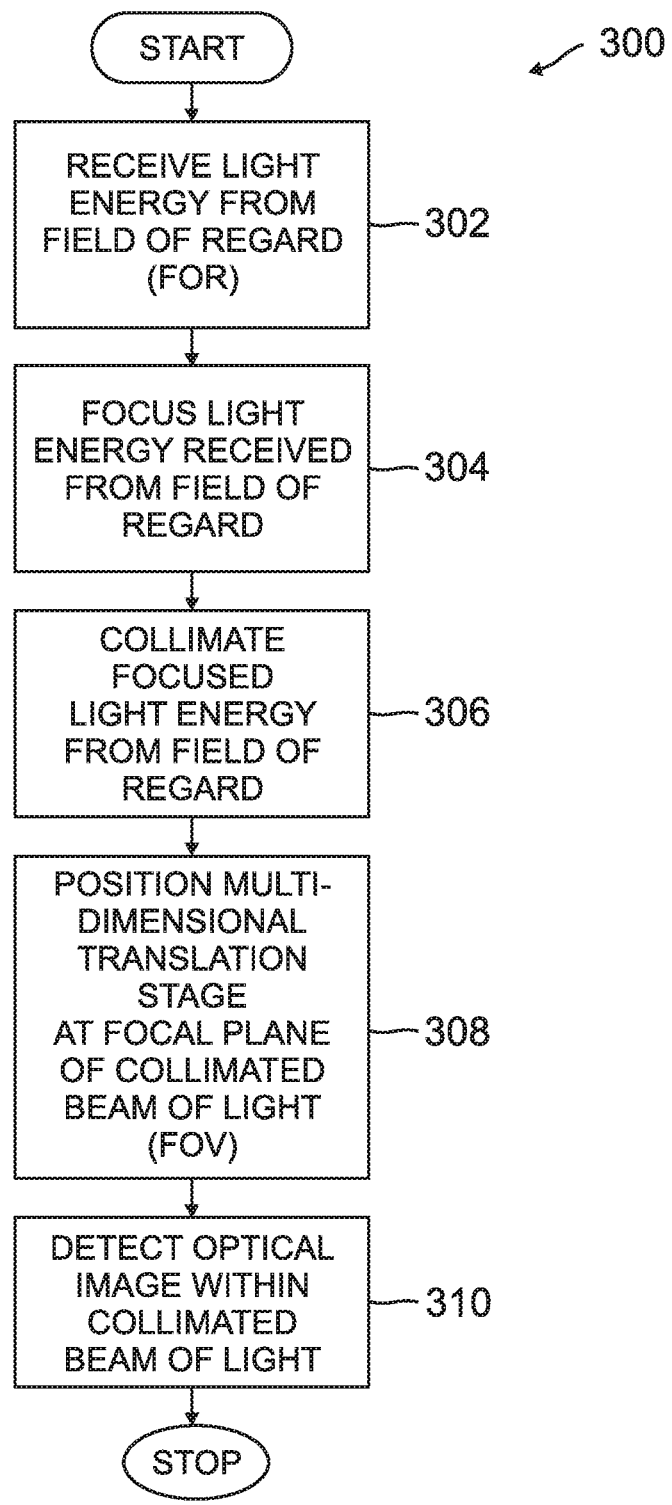
FIG. 3 illustrates a method of operation that can be utilized to implement one example embodiment of the present invention.

FIG. 3 illustrates a method of operation 300, which can be utilized to implement one example embodiment of the present invention. For example, the method 300 can be utilized to implement optical image tracking in the system 100 depicted in FIG. 1. Referring to FIG. 3, the exemplary method 300 begins by receiving light energy from a field of regard (302). Next, the light energy received from the field of regard is focused to a focal point by a system objective lens (304). The focused light from the field of regard is then collimated to form a plurality of collimated beams of light (306). The multi-dimensional translation stage 114 is then positioned at the focal plane of a collimated beam of light for an angle associated with a specific field of view within the field of regard (308). The FPA 116, which is attached to the multi-dimensional translation stage 114 and thus positioned at the focal plane of the collimated beam of light associated with the specific field of view, then detects the optical image within the collimated beam of light for the specific field of view (310).

Terms of relative position as used in this application are defined based on a plane parallel to, or in the case of the term coplanar—the same plane as, the conventional plane or working surface of a layer, regardless of orientation. The term "horizontal" or "lateral" as used in this application are defined as a plane parallel to the conventional plane or working surface of a layer, regardless of orientation. The term "vertical" refers to a direction perpendicular to the horizontal. Terms such as "on," "side" (as in "sidewall"), "higher," "lower," "over," "top," and "under" are defined with respect to the conventional plane or working surface being on the top surface of a layer, regardless of orientation. The term "coplanar" as used in this application is defined as a plane in the same plane as the conventional plane or working surface of a layer, regardless of orientation.

EXAMPLE EMBODIMENTS

Example 1 includes an optical image tracker, comprising: a multi-dimensional translation stage; an optical image detector disposed on a surface of the multi-dimensional translation stage; and an objective lens coupled to the optical image detector and configured to focus a collimated beam of light on the optical image detector, wherein the collimated beam of light includes a specific field of view within a field of regard, and the multi-dimensional translation stage is configured to position the optical image detector to detect the collimated beam of light.

Example 2 includes the optical image tracker of Example 1, wherein the multi-dimensional translation stage is configured to position the optical image detector at a focal plane of the collimated beam of light.

Example 3 includes the optical image tracker of any of Examples 1-2, wherein the optical image detector is a focal plane array.

Example 4 includes the optical image tracker of any of Examples 1-3, wherein the field of regard is approximately 120 degrees.

Example 5 includes the optical image tracker of any of Examples 1-4, wherein a maximum field of view is approximately 120 degrees.

Example 6 includes the optical image tracker of any of Examples 1-5, wherein the multi-dimensional translation stage is configured to position the optical image detector along at least one of a horizontal axis, a vertical axis, a pitch axis, and a yaw axis.

Example 7 includes the optical image tracker of any of Examples 1-6, wherein the optical image detector is configured to move along the optical axis of a focusing lens of a camera.

Example 8 includes the optical image tracker of any of Examples 1-7, wherein the optical image detector is attached to the objective lens.

Example 9 includes a method of operation of an optical image tracker, comprising: receiving light energy from a field of regard; collimating the light energy from the field of regard; positioning a multi-dimensional translation stage at a focal plane of a collimated beam of light associated with a field of view within the field of regard; and detecting an optical image in the collimated beam of light.

Example 10 includes the method of operation of Example 9, wherein the positioning comprises positioning the multi-dimensional translation stage with five degrees of freedom.

Example 11 includes the method of operation of any of Examples 9-10, wherein the detecting comprises detecting the optical image with a focal plane array.

Example 12 includes the method of operation of any of Examples 9-11, wherein the positioning the multi-dimensional translation stage comprises positioning along at least one of a horizontal axis, a vertical axis, a pitch axis, and a yaw axis.

Example 13 includes the method of operation of any of Examples 9-12, wherein the positioning the multi-dimensional translation stage comprises translating a focal plane array along an optical axis.

Example 14 includes the method of operation of Example 13, wherein the translating comprises controlling a focus of the optical image.

Example 15 includes a system, comprising: a first objective lens configured to receive light energy from a field of view within a field of regard and convey the received light energy to a first focal point; a second objective lens configured to focus a beam of collimated light energy from the field of view to a second focal point; an optical image detector coupled to the second objective lens and configured to detect an optical image associated with the collimated light energy from the field of view at the second focal point; a multi-dimensional translation stage coupled to the second objective lens and the optical image detector and configured to detect an optical image within the field of view; a controller coupled to the optical image detector and the multi-dimensional translation stage and configured to position the multi-dimensional translation stage in response to an error signal from the optical image detector; and a processing system coupled to the controller and configured to receive and process the detected optical image.

Example 16 includes the system of Example 15, wherein the field of regard is approximately 120 degrees.

Example 17 includes the system of any of Examples 15-16, wherein the second objective lens is an objective lens of a camera Example 18 includes the system of any of Examples 15-17, wherein the processing system comprises at least one of a microcontroller, a personal computer, and a digital processor.

Example 19 includes the system of any of Examples 15-18, wherein the system comprises a star tracker system.

Example 20 includes the system of any of Examples 15-19, wherein the system comprises a celestial-aided navigation system.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. An optical image tracker, comprising:
   a multi-dimensional translation stage;
   an optical image detector disposed on a surface of the multi-dimensional translation stage; and
   an objective lens coupled to the optical image detector and attached to the multi-dimensional translation stage and configured to focus a collimated beam of light on the optical image detector, wherein the collimated beam of light includes a specific field of view within a field of regard, and the multi-dimensional translation stage is configured to position the optical image detector at a position within the collimated beam of light associated with the specific field of view.

2. The optical image tracker of claim 1, wherein the multi-dimensional translation stage is configured to position the optical image detector at a focal plane of the collimated beam of light.

3. The optical image tracker of claim 1, wherein the optical image detector is a focal plane array.

4. The optical image tracker of claim 1, wherein the field of regard is approximately 120 degrees.

5. The optical image tracker of claim 1, wherein a maximum field of view is approximately 120 degrees.

6. The optical image tracker of claim 1, wherein the multi-dimensional translation stage is configured to position the optical image detector along at least one of a horizontal axis, a vertical axis, a pitch axis, and a yaw axis.

7. The optical image tracker of claim 1, wherein the optical image detector is configured to move along the optical axis of a focusing lens of a camera.

8. The optical image tracker of claim 1, wherein the optical image detector is attached to the objective lens.

9. A method of operation of an optical image tracker, comprising:
   receiving light energy from a field of regard;
   collimating the light energy from the field of regard;
   positioning a multi-dimensional translation stage at a focal plane of a collimated beam of light associated with a field of view within the field of regard; and
   detecting an optical image in the collimated beam of light.

10. The method of operation of claim 9, wherein the positioning comprises positioning the multi-dimensional translation stage with five degrees of freedom.

11. The method of operation of claim 9, wherein the detecting comprises detecting the optical image with a focal plane array.

12. The method of operation of claim 9, wherein the positioning the multi-dimensional translation stage comprises positioning along at least one of a horizontal axis, a vertical axis, a pitch axis, and a yaw axis.

13. The method of operation of claim 9, wherein the positioning the multi-dimensional translation stage comprises translating a focal plane array along an optical axis.

14. The method of operation of claim 13, wherein the translating comprises controlling a focus of the optical image.

* * * * *